(12) United States Patent
Magee et al.

(10) Patent No.: US 7,512,278 B2
(45) Date of Patent: Mar. 31, 2009

(54) SCALABLE ARRAY ENCODING SYSTEM AND METHOD

(75) Inventors: Mark Magee, Campbell, CA (US); Wayne Michelsen, Mountain View, CA (US); Jean Dumouchel, Los Gatos, CA (US); Randall S. May, Los Gatos, CA (US); Peter Michael Emanuel, Santa Cruz, CA (US); Robert S. Robinett, Menlo Park, CA (US)

(73) Assignee: Modulus Video Inc., Menlo Park, CA (US)

( * ) Notice: Subject to any disclaimer, the term of this patent is extended or adjusted under 35 U.S.C. 154(b) by 930 days.

(21) Appl. No.: 10/820,524

(22) Filed: Apr. 7, 2004

(65) Prior Publication Data

US 2005/0058207 A1 Mar. 17, 2005

(51) Int. Cl.
*G06K 9/36* (2006.01)
(52) U.S. Cl. ...................................... 382/232
(58) Field of Classification Search ......... 382/232–236, 382/238–240, 244–250; 348/646, 660, 720; 375/342.01, 240.02, 240.12
See application file for complete search history.

(56) References Cited

U.S. PATENT DOCUMENTS

| | | | |
|---|---|---|---|
| 5,815,209 A | 9/1998 | Kondo et al. | |
| 6,275,536 B1* | 8/2001 | Chen et al. | 375/240.25 |
| 6,404,928 B1* | 6/2002 | Shaw et al. | 382/232 |
| 6,441,754 B1* | 8/2002 | Wang et al. | 341/50 |
| 6,731,684 B1 | 5/2004 | Wu | |
| 6,731,685 B1* | 5/2004 | Liu et al. | 375/240.14 |
| 6,782,132 B1* | 8/2004 | Fogg | 382/232 |
| 6,904,094 B1* | 6/2005 | Liu et al. | 375/240.13 |
| 7,039,115 B1* | 5/2006 | Wu | 375/240.26 |

* cited by examiner

*Primary Examiner*—Jose L Couso
(74) *Attorney, Agent, or Firm*—Larry T. Cullen

(57) ABSTRACT

An array encoding system and method for use with high definition digital video data streams includes method and means for analyzing the incoming data stream, splitting the data stream in accordance with video complexity or other criteria, encoding each of the subsidiary data streams in accordance with a desired encoding standard, and combining the data streams to generate an output. The encoding system and method is particularly suited to encoding data streams to provide an output with is substantially consistent with the H.264 video communications standard. The system and method are scalable.

17 Claims, 10 Drawing Sheets

```
First encoder frame sequence
Display order:   I10-B11-B12-P13-B14-B15-I16
Decode  order:   I10-P13-B11-B12-I16-B14-B15
```
⎬ 300

```
Second encoder frame sequence
Display order:   I20-B21-B22-P23-B24-B25-I26
Decode  order:   I20-P23-B21-B22-I26-B24-B25
```
⎬ 310

```
Third encoder frame sequence
Display order:   I30-B31-B32-P33-B34-B35-I36
Decode  order:   I30-P33-B31-B32-I36-B34-B35
```
⎬ 320

```
Concatenated frame sequence
Display order:   I10-B11-B12-P13-B14-B15-I16-
                 B21-B22-P23-B24-B25-I26-
                 B31-B32-P33-B34-B35-I36
Decode  order:   I30-P33-B31-B32-I36-B34-B35-
                 P23-B21-B22-I26-B24-B25-
                 P33-B31-B32-I36-B34-B35
frame_num:        0-  1-  2-  3-  0-  1-  2-
                  3-  4-  5-  0-  1-  2-
                  3-  4-  5-  0-  1-  2-
```
⎬ 330

*Figure 3. Open GOP Sequence from Closed GOP encoder*

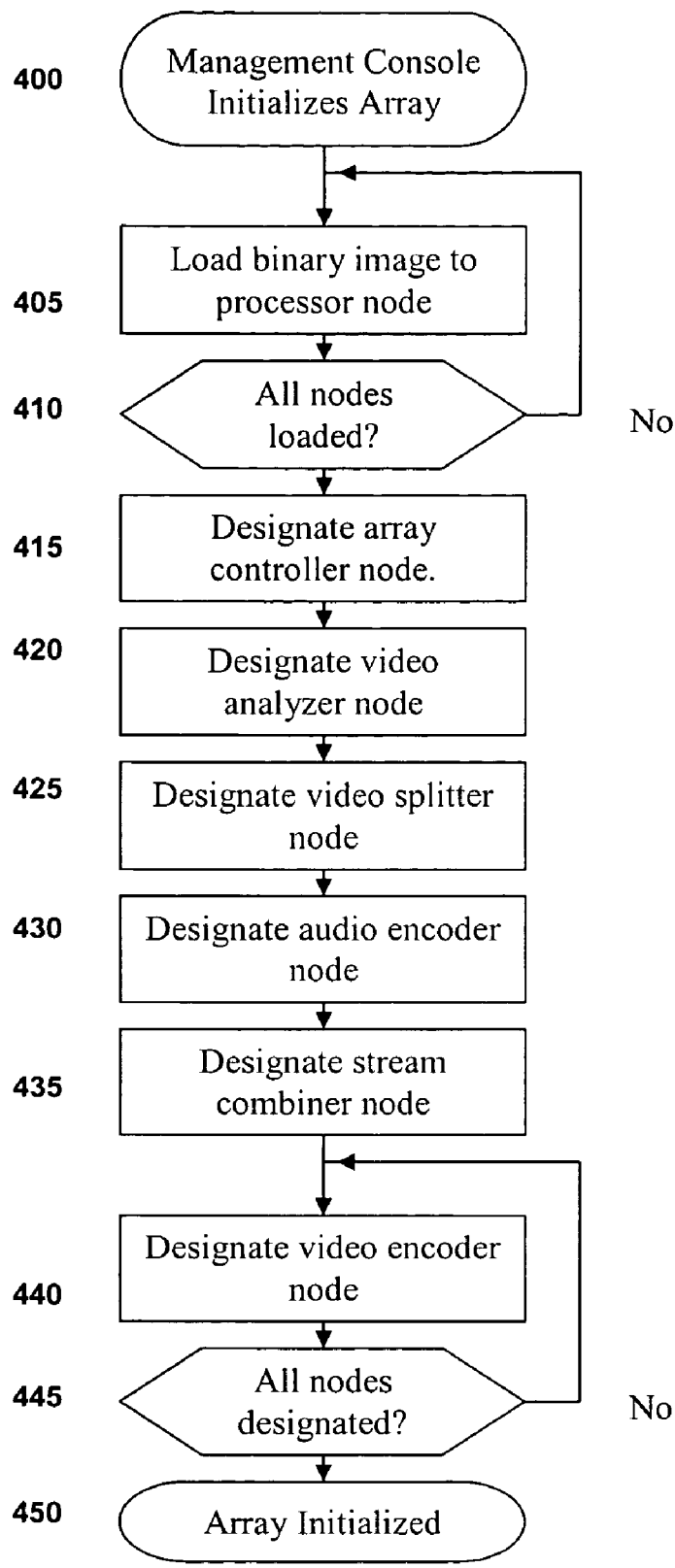
Figure 4. Array Initialization

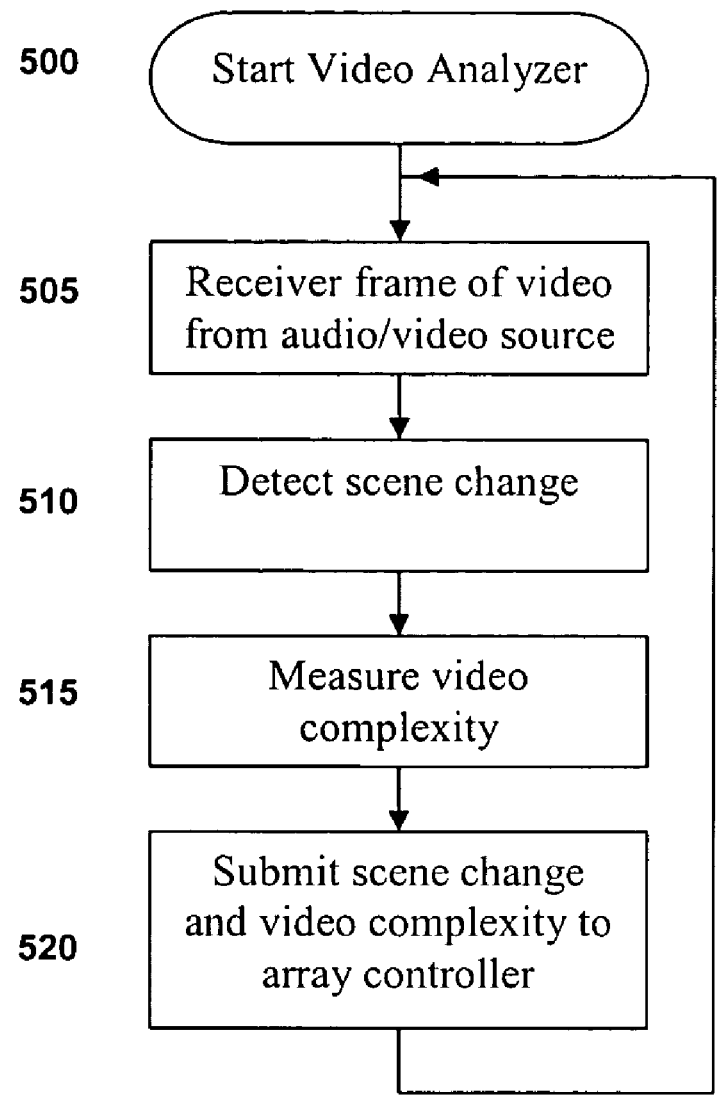
Figure 5. Video Analyzer Process

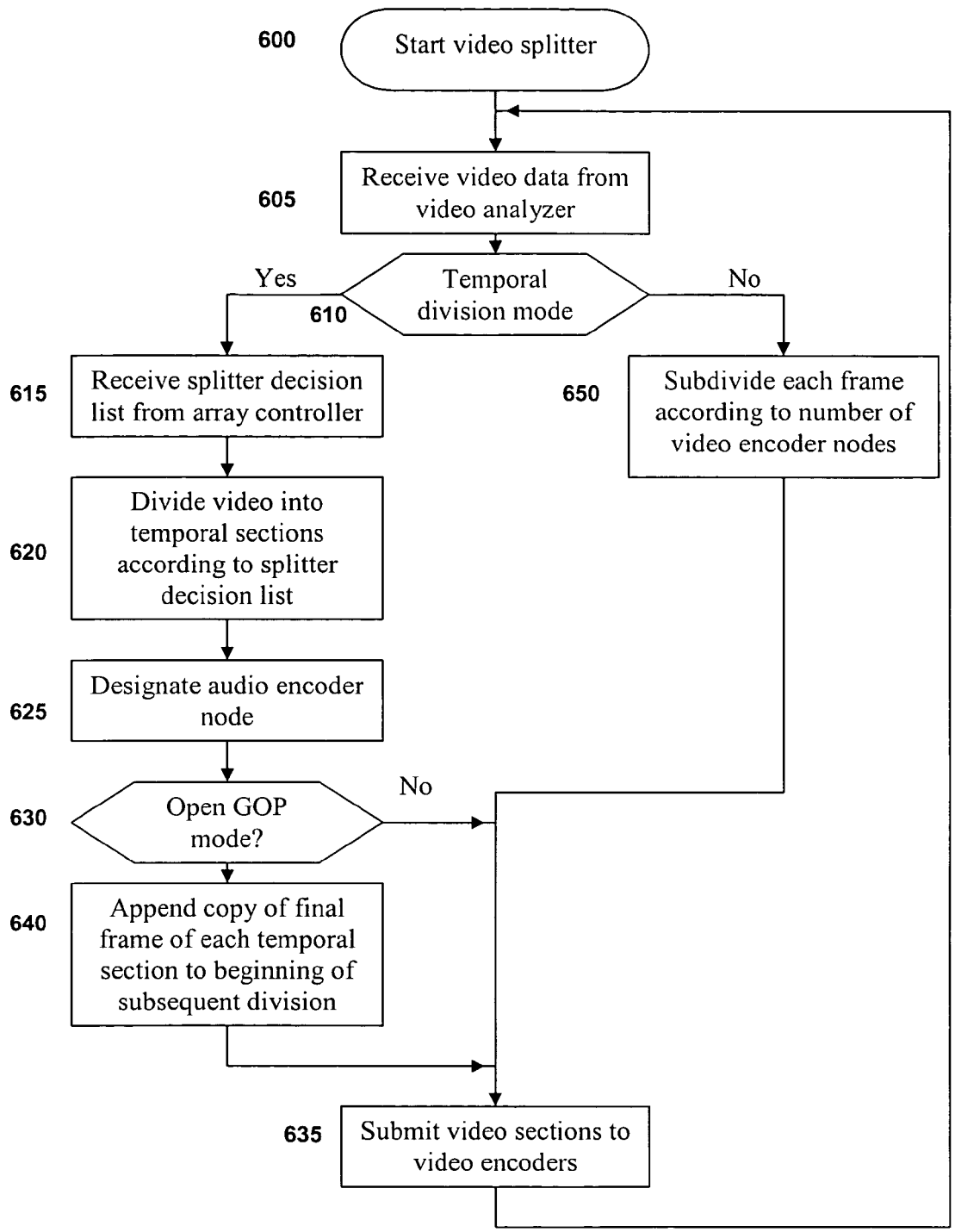
Figure 6. Video Splitter Process

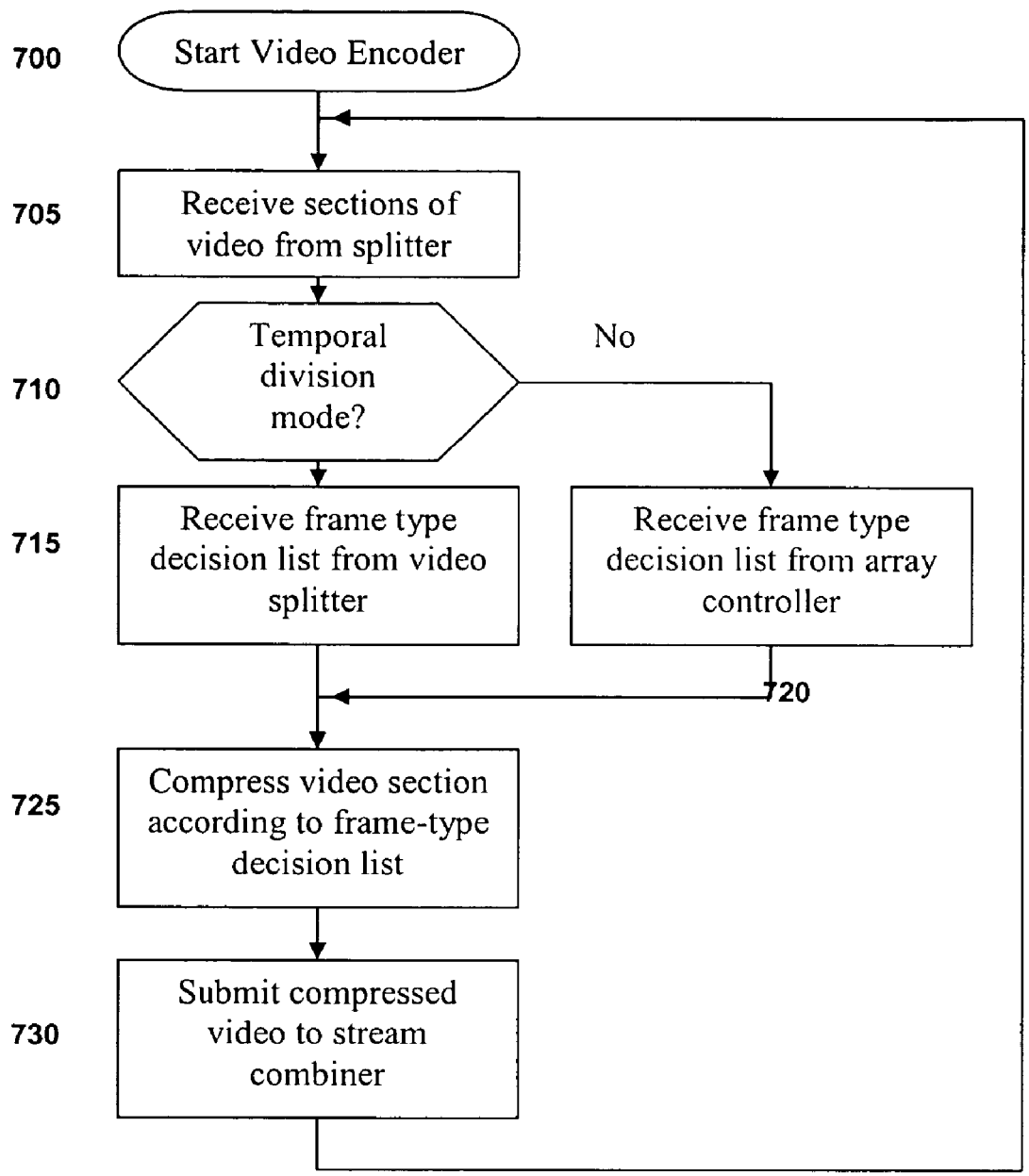
Figure 7. Video Encoder Process

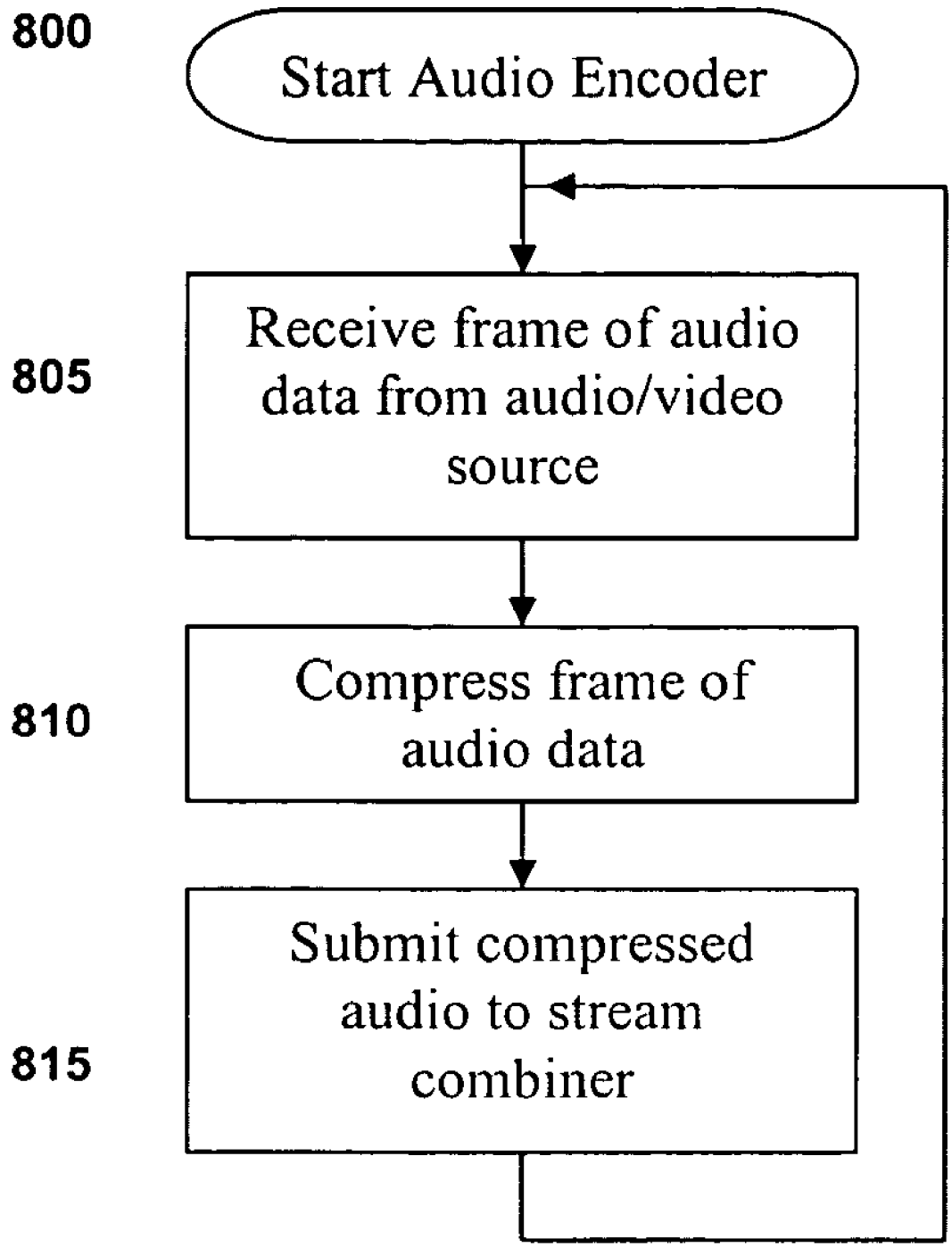
*Figure 8. Audio Encoder Process*

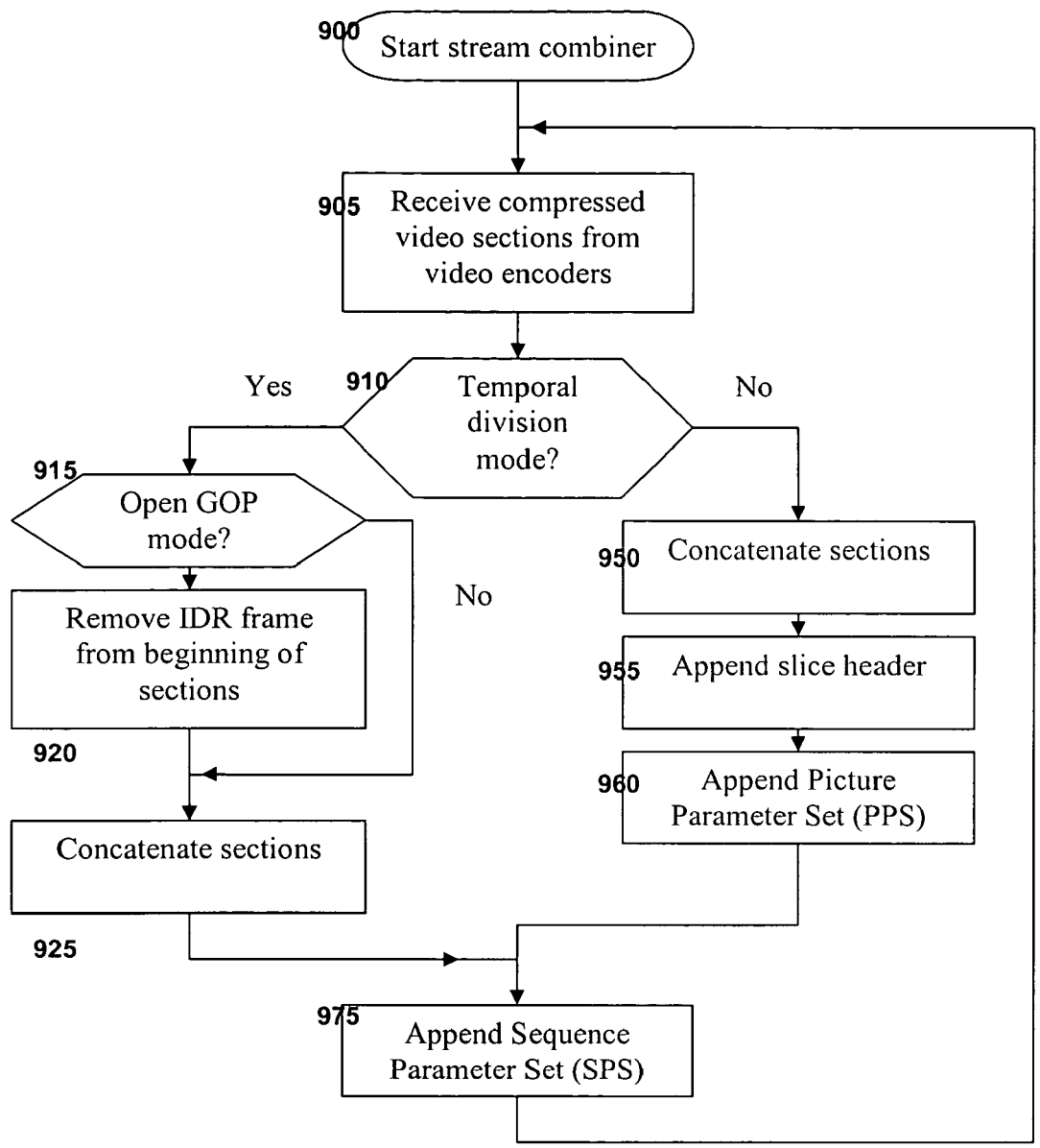
Figure 9. Stream Combiner Process

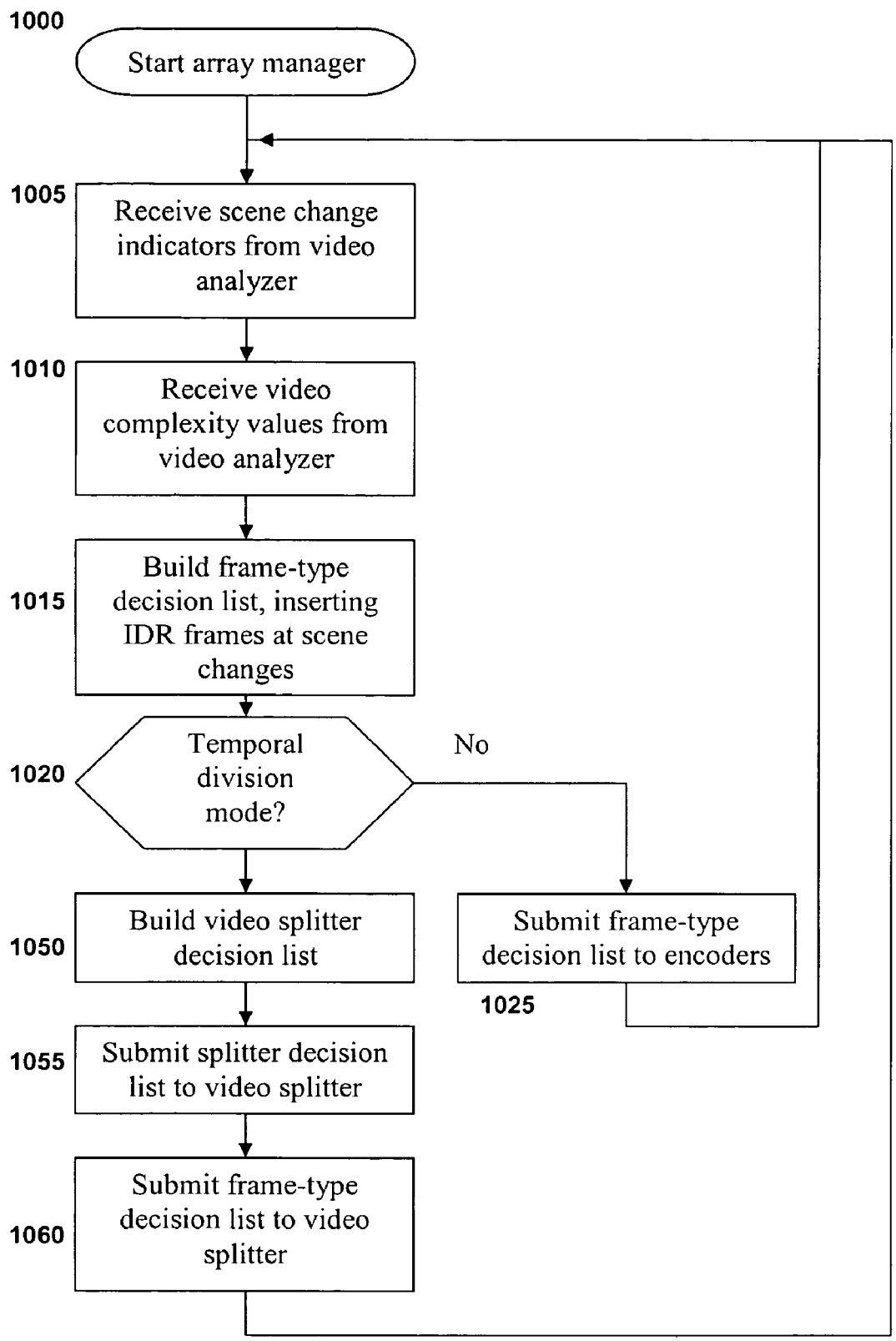
Figure 10. Array Controller Process

SCALABLE ARRAY ENCODING SYSTEM AND METHOD

FIELD OF THE INVENTION

This invention relates generally to video encoding techniques, and more particularly relates to video encoding techniques compatible with the H.264 standard and extensions thereof.

BACKGROUND OF THE INVENTION

The development of networking, including the Internet, has led to a nearly insatiable desire for instant access to large amounts of data on the part of computer users. Among the most demanding forms of data is video data, both in terms of raw size and complexity. As a result, numerous forms of video encoding have been developed to attempt to compress video data into a form which gives an acceptable display while at the same time reducing the datastream to a size which is operable on the intended networks.

This desire for video compression led to the widely accepted MPEG-2 standard, which is the standard underlying DVD's, ATSC digital terrestrial broadcast, and many other forms of digital video. In greatly simplified terms, MPEG-2 compression analyzes a sequence of video frames (referred to as a "GOP" or "Group of Pictures") and identifies similarities among those frames, which avoids the need to send the repetitive data for each frame. A "GOP sequence" then provides a guide for decoding the compressed MPEG-2 data so that it can be displayed. However, MPEG-2 does not offer adequate efficiency for high volumes of video data, especially high resolution video such as HDTV.

These shortcomings have led to a newly developed international standard, known as ITU-T Rec. H.264 and ISO/IEC MPEG-4 part 10. This standard represents a significant improvement over MPEG-2. The H.264 standard offers greatly improved compression efficiency, typically on the order of two to three times the efficiency of MPEG-2. But this efficiency comes at the price of processing complexity. The complexity of a typical H.264 encoder is 10 to 20 times the processing capacity of an MPEG-2 encoder.

H.264 offers the most compelling advantage for high definition television (HDTV) applications. The bandwidth requirements of HDTV are six times that of standard definition television (SDTV), meaning that H.264 offers greater impact to bandwidth requirements for HDTV channels. However, an HDTV encoder requires approximately six times the processing capacity of an SDTV encoder.

Combining the processing requirements of H.264 and those of HDTV, the processing capacity of an H.264 HDTV encoder is required to be on the order of 60 to 120 times that of an MPEG-2 SDTV encoder. Due to the complexity of H.264 it is exceedingly difficult to process video at real-time rates, especially at high resolutions.

Although array encoders have been used for MPEG-2 applications, this technology has not been extended to the emerging, more complex H.264 standard. Likewise, a stat mux with feedforward has been used in MPEG-2 video encoding systems, but this approach has not been extended to the more complex H.264 standard.

BRIEF DESCRIPTION OF THE FIGURES

FIG. 3 shows an open GOP ["Group of Pictures"] sequence from a closed GOP encoder in accordance with the invention.

FIG. 4 shows in flow diagram form an exemplary process flow of array initialization in accordance with the invention.

FIG. 5 shows in flow diagram form an exemplary video analyzer process in accordance with the present invention.

FIG. 6 shows in flow diagram form an exemplary video splitter process in accordance with the present invention.

FIG. 7 shows in flow diagram form an exemplary video encoder process in accordance with the present invention.

FIG. 8 shows in flow diagram form an exemplary audio encoder process in accordance with the present invention.

FIG. 9 shows in flow diagram form an exemplary stream combiner process in accordance with the present invention.

FIG. 10 shows in flow diagram form an exemplary array controller process in accordance with the present invention.

SUMMARY OF THE INVENTION AND DETAILED DESCRIPTION OF THE INVENTION

The present invention provides a Scalable Array Encoder which complies with the H.264 and achieves higher performance, in terms of compute time, throughput, video resolution and perceived video quality, than can be achieved with a conventional H.264 encoder.

Figure 1:
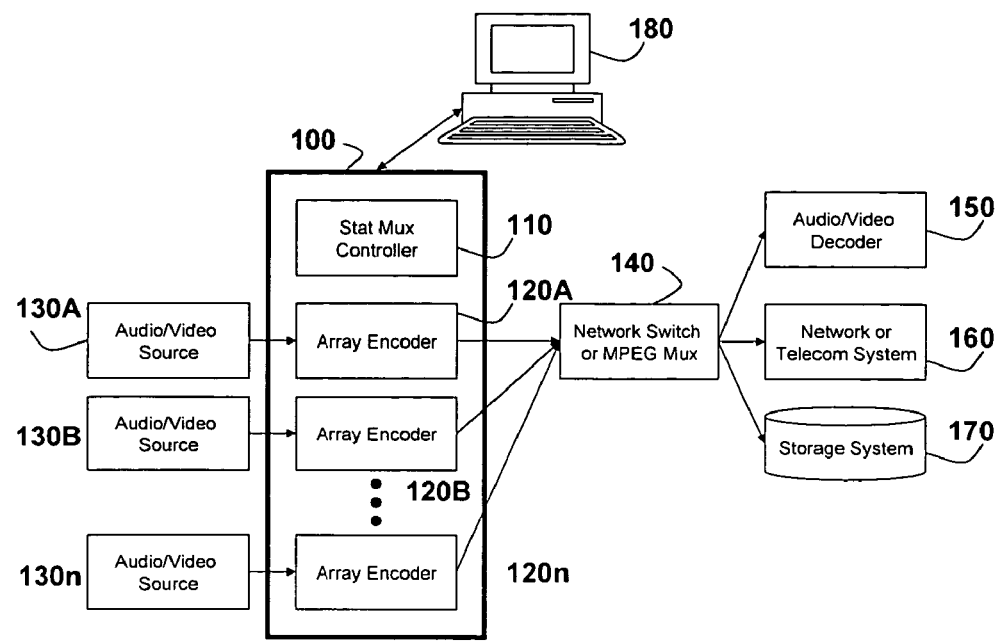
FIG. 1 illustrates a system level view of a scalable array encoding system arranged in a statmux configuration in accordance with the present invention, which provides rate-distortion optimization over multiple channels of digital television in accordance with the H.264 standard.

Referring to FIGS. 1 through 10, a stat mux system 100 (FIG. 1), which may in broad terms be thought of as a scalable encoding system, includes a stat mux controller 110 and a plurality of array encoders 120A-n. FIG. 1 illustrates an exemplary arrangement of multiple encoding systems arranged in a statmux configuration. Each of a plurality of channels of audio/video information 130A-n provide audio/video input to an associated array encoder 120A-n. Each array encoder 120 comprises a multiplicity of video encoders 230 (FIG. 2), each of which encodes a section of the video provided by the associated audio/video source 200. Each video encoder 230 performs a video compression operation over a subset of the incoming video and produces an output data stream consistent with the H.264 video communication standard.

An array controller 225 initializes the video encoders 230 and controls the real-time operation of the encoders.

The operation of an exemplary embodiment of a scalable array encoding system in accordance with the invention includes several levels of data flow: flow of video, flow of audio, flow of management information, and flow of control information. Each of these processes is explained in greater detail below.

Flow of Video

Figure 2:
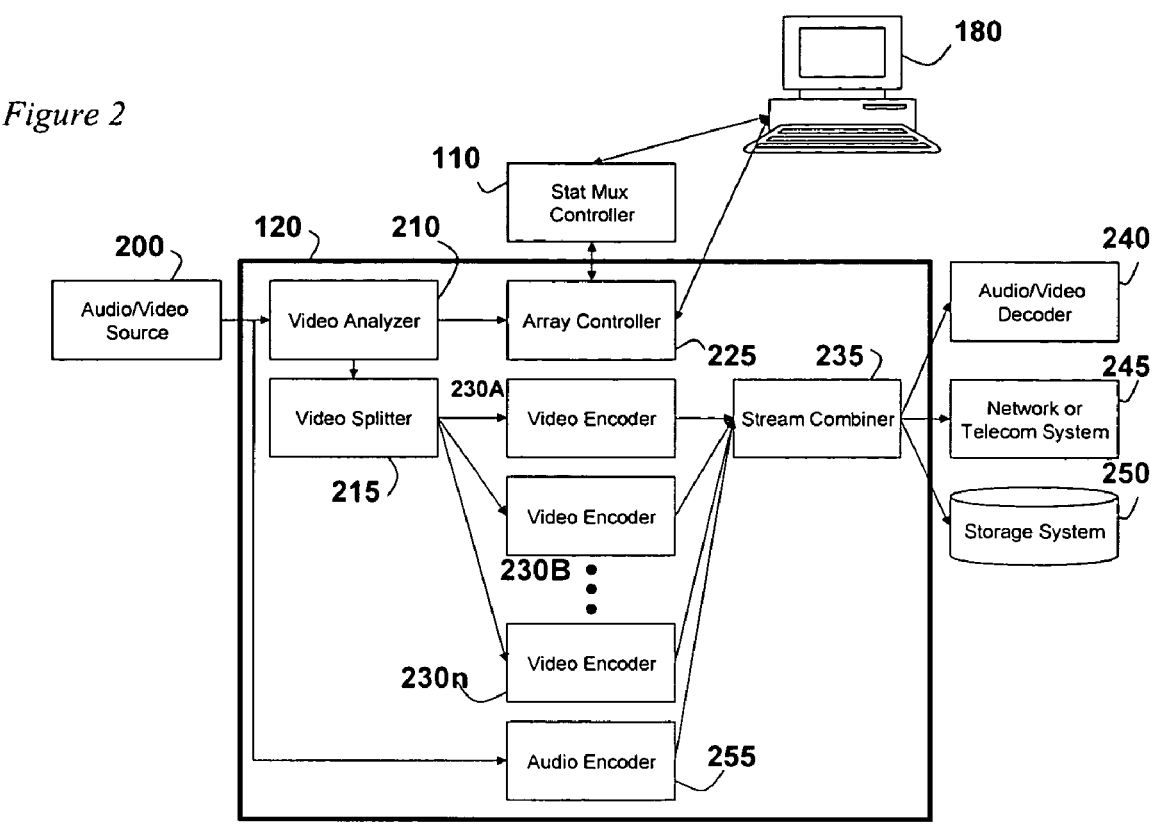
FIG. 2 illustrates a system level view of an Array Encoder in accordance with the present invention, and in particular shows multiple video encoders operating on multiple video partitions.

Referring first to FIGS. 1 and 2, the flow of video through the array encoder 120 is as follows. The audio/video source 200 provides input to the video analyzer 210. In order to optimize the selection of frame types, and thereby improve compression efficiency, the video analyzer 210 extracts information from the incoming video and passes the video to the video splitter 215. The information extracted typically relates to the complexity of the frame and to scene changes which indicate that predictive encoding will not be effective. Complexity information includes both spatial complexity, which involves measures of detail and edges, and temporal complexity, which measures motion relative to previous frames.

In order to spread out the processing load, and thereby increase the rate of video processing the video splitter 215 divides the video according to the selected division mode, spatial or temporal, and passes the divisions of video to the multiplicity of video encoders 230. The outputs of the multiplicity of video encoders 230 are passed to the stream combiner 235. The stream combiner 235 concatenates these streams according to the selected division mode, spatial or temporal, and appends elements of the H.264 protocol not provided by the multiplicity of video encoders 230. The audio/video destinations, for example audio/video decoder 240, network or telecom system 245, or storage system 250 receive the output of the stream combiner 235. As shown by, for example, the network switch or MPEG mux 140 in FIG. 1, there may be intermediate devices and connections between the output of the stream combiner 235 and the destinations.

Flow of Audio

The flow of audio through the array encoder 120 is as follows. The audio/video source provides input to the audio encoder 255. The audio encoder produces a compressed audio bit stream which is passed to the stream combiner 235. The audio/video destinations, for example audio/video decoder 240, network or telecom system 245, or storage system 250 receive the output of the stream combiner 235. As with the video flow, intermediate devices or network connections may exist.

Flow of Management Information

Referring again particularly to FIGS. 1 and 2, the flow of control and management information is as follows. Through a management console 180, the user specifies the configuration of the stat mux system 100 and each of a multiplicity of array encoders 120A-n. Within a statmux system 100, the statmux controller 110 receives the user input from the management console 180. Within each array encoder 120, the array controller 225 receives the user input from the management console 180.

Flow of Control Information

In order to optimize rate-distortion performance over a multiplicity of video channels, the stat mux controller 110 and a multiplicity of array controllers 225 exchange information regarding video complexity and bit rate allocation.

The video analyzer 210 extracts information from the incoming video signal, and passes that information to the array controller 225. The array controller 225 uses this information in its interchange with the stat mux controller 110 and to control the operation of the encoders 230 and to control the operation of the stream combiner 235.

The operation of exemplary versions of certain functional blocks which can form part of the invention can be better understood from the following:

Stat Mux Controller 110

As shown In FIG. 1, stat mux controller 110 optimizes rate-distortion performance for a multiplicity of array encoders 120, accepts complexity estimates from a multiplicity of array encoders 120. From a total available pool of bit budget, which is based on the throughput of the telecommunications system 160, the stat mux controller 110 determines optimal allocation and outputs a multiplicity of bit budgets to a multiplicity of array encoders 120. Stat mux controller 110 accepts feedback from the telecommunications system 160 via network switch 140 to adjust the total available pool based on dynamic conditions of network congestion.

Video Analyzer 210

In FIG. 2, the video analyzer 210 processes the incoming video from video source 200, examples of video source 200 include but are not limited to disk subsystem, tape subsystem, telecom receiver. The function of the video analyzer 210 is to extract information from the video stream which can be used by the array controller 225 to make the better decisions in how to use H.264's flexible encoding protocol to achieve optimal efficiency. The video analyzer 210 detects scene changes, and signals these changes to the array controller 225, which adjust frame type cadence in accordance. The video analyzer 210 estimates the bit rate which will be required by the video encoders 230 to produce a bitstream of constant video quality and feeds forward the video complexity estimates to array controller 225.

Video Splitter 215

The fundamental method of performance gain achieved by the array encoder is distributing the video encoding task over a multiplicity of processing nodes. The splitter facilitates this by dividing the incoming video across the multiplicity of video encoders 230. In FIG. 2, the video splitter 215 divides the incoming video, and sends sections to video encoders 230. The division may be either spatial or temporal. In spatial division mode the video splitter 215 divides each picture into a multiplicity of spatially contiguous patches. In temporal division mode the video splitter 215 divides video sequence into a multiplicity of temporally contiguous groups of pictures.

Array Controller 225

The array controller 225 controls and coordinates the actions of the multiplicity of video encoders to produce compliant streams and to provide optimal performance. The array controller 225 performs two way communication with stat mux controller 110. The array controller 225 sends video complexity estimates to stat mux controller 1100, and receives a bit budget from stat mux controller 220.

The array controller 224 controls rate control (i.e. bit budgets) of individual encoders 230 to maintain the aggregate within the overall bit budget. The overall bit budget for an array may be derived from allocations received from Stat Mux controller 220, may be static, may be adjusted in response to congestion in a telecom network 245, or may be left free for an application which uses fixed video quality The array controller 225 uses the Message Passing Interface (MPI) protocol to communicate with the other elements of the array encoder 120. Each element of the array encoder is implemented in a general purpose computer, supporting an operating system such as Linux or Windows, and connected to a common TCP/IP network.

In one arrangement, an identical binary image is loaded into each element of the array processor 120. The function performed by each element is determined by the assigned process class. An exemplary implementation may include five process classes. A_cntrl is the master control process. Video_encode is the CPU intensive process which produces H.264 streams which represent video sections. Audio_encode is the process which produces compressed streams representing the audio input. Video_anlz is the process which analyzes the incoming video to allow dynamic response to changes in the properties of the video. Video_split is the process which divides the incoming video into sections. S_combine is the process which concatenates the outputs of the video_encode processes into the final H.264 stream.

The process number assigned to each element of the array processor determines its process class. The array controller 225 is assigned process 0, which designates master process class. The audio encoder 255 is assigned process 1, which designates audio_encode process class. The video analyzer 210 is assigned process 2, which designates video_anlz process class. The video splitter 215 is assigned process 3, which designates video_split process class. The stream combiner 235 is assigned process 4, which designates s_combine process class. The video encoders 230 are assigned process 5-N, which designate video_encoder process class.

In FIG. 2, the array controller 225 controls frame types (aka GOP structure) across a multiplicity of encoders 230A-n, based on inputs from video analyzer 210. The array controller 225 manages the decoder reference buffer, by providing frame count and reference ID information to the encoders 230A-n. This assures consistent use of reference memory indexing across the multiplicity of encoders 230A-n.

In temporal division mode, the array controller 225 is able to coordinate a multiplicity of encoders 230 which are configured as closed GOP encoders in a manner that creates an open GOP stream. A closed GOP encoder creates a sequence which ends in an anchor frame, i.e. IDR frame or P frame, in display order, as shown in FIG. 3. Frame sequences 300, 310, and 320 each indicate closed GOP sequences which end in an IDR frame. IDR frames are indicated by and "I" in FIG. 3. Each frame in FIG. 3 is followed by a unique identifier to clarify the concatenation operation shown in sequence 330.

The last input video frame in each sequence sent to each encoder 230A-n by the video splitter 215 is duplicated as the first input video frame in the subsequent sequence of frames sent to the next encoder 230 in the array encoder 120. The array controller 225 enforces identical encoding of the ending IDR of each sequence and the beginning IDR of the following sequence. Upon concatenation, the initial IDR of each sequence other than the initial sequence, is discarded.

Frame_num is an element of the H.264 syntax which appears in the slice header. IDR frames are required by H.264 semantics to carry a frame_num of 0. H.264 semantics specify that each subsequent frame in decode order carries a frame_num value that is incremented by 1 relative to the previous frame.

Each of the duplicate IDR frames that is to be discarded in the concatenation operation in the stream combiner 235 carries an invalid frame-num. The frame_num of these IDR frames is adjusted to compensate for the number of non-reference frames which follow, in decode order, the last IDR frame, in display order, of the previous group of frames. In the case indicated in FIG. 3, there are two B frames between anchor frames. Thus the duplicate IDR frames are given a value of frame_num equal to 2. This ensures that the concatenated stream will have the proper sequence of frame_num values.

In spatial division mode, the array controller makes all frame and picture type decisions, and communicates those decisions to the multiplicity of encoders 230 to assure that each encoder is encoding to the same frame type. In either spatial or temporal division mode the array controller 225 provides optimal allocation of frames types (IDR, P, B) based on complexity estimates received from Video Analyzer 210.

The array controller 225 controls bit budgets for each of the multiplicity of encoders 230. In spatial mode the array controller subdivides frame bit budget into slice bit budgets for each encoder 230 based on video complexity estimates (generated by the video analyzer 210) for its assigned sections of video relative to overall video complexity of the picture. In temporal division mode the array controller allocates GOP bit budgets based on an overall model of decoder channel buffer and reference memory usage.

The array controller 225 controls the Sequence Parameter Set and Picture Parameter Set functions of the Stream Combiner 235 by providing data sets to Stream Combiner based on operational configuration of the array encoder 120 as set by the management console 180.

Video Encoders 230

Each encoder 230 processes a section of video. Sections of video received from the video splitter 215 may be spatial divisions or temporal divisions. In temporal division mode each encoder 230 produces a bitstream which represents a series of pictures. Each encoder receives identical control information regarding picture type, for example IDR, B or P, and bit budget for each picture from the array controller 225.

In spatial division mode there are two modes of operation. In 'single slice per encoder' mode, each encoder 230 produces a bitstream which represents a slice of video. In 'single slice per picture' mode each encoder 230 produces a subset of a slice, and relies on the stream combiner 235 to append a slice header and concatenate these subsets into a valid slice.

Temporal Division mode—each encoder 230 produces a bitstream which represents a series of pictures.

In spatial partition mode each of the multiplicity of encoders 230 shares reconstructed reference memory with each of the multiplicity of encoders 230 to allow full range of motion estimation. For single slice per picture mode within the spatial partition mode, encoders 230 share reconstructed reference data near the section boundaries to allow H.264 de-blocking filter to span encoders, and they share motion vectors in partitions adjacent to the section boundary to allow motion H.264 vector prediction to span encoders.

Stream Combiner 235

The function of the stream combiner 225 is to facilitate the parallel processing by the video encoders 230 by combining their outputs into a unified representation of the original video input. In FIG. 2, the stream combiner 235 takes input from the encoders 230. The array 225 controller defines a common set of configuration for the encoders 230 which correspond to a specific set of values in the H.264 Sequence Parameter Sets (SPS) and Picture Parameter Sets (PPS) fields. The stream combiner 235 inserts SPS and PPS into the H.264 stream based on encoder 230 configuration information conveyed by array controller 225. The stream combiner 235 splices streams together to form a compliant stream.

In temporal division mode the stream combiner 235 concatenates streams from a multiplicity of encoders 230, each of which streams represents a groups of pictures.

Within spatial division mode, there are two modes of operation: one slice per encoder 230, and one slice per video frame. In one slice per encoder mode, the stream combiner 235 concatenates slice streams from encoders 230 to form a stream for a picture. In once one slice per frame mode, the stream combiner 235 generates a slice header, concatenates and encoder 230 outputs to form a stream for a picture.

The foregoing functional block descriptions may be better understood in connection with the process flow diagrams of FIGS. 4 through 10.

Referring first to FIG. 4, the array initialization process is represented in simplified form. At step 400, the management console 180 initializes the array, after which the relevant binary image is loaded into a processor node at step 405. A check is then made at step 410 to ensure that an image has been loaded into each node. If not, the process loops back to step 405 until all nodes have been loaded with the appropriate binary image.

Once each node has been loaded, the array controller node is designated at step 415, a video analyzer node is designated at step 420, a video splitter node is designated at step 425, an audio encoder node is designated at step 430 and a stream combiner node is designated at step 435. Further, a video encoder node is designated at step 440. A check is then made at step 445 to ensure that all requisite nodes have been designated. If not, the process loops back to step 435. Once all nodes have been designated, the array has been initialized and the process terminates as shown at step 450.

Referring next to FIG. 5, the process running in the video analyzer 210 may be better understood. The process starts at step 500, after which a frame of video information is received at step 505 from the audio/video source 200. The frame is analyzed to detect scene changes, as shown at step 510, and video complexity is measured at step 515. The scene change and complexity information is then submitted to the array controller 225 at step 520. The process then loops back to step 505 and begins processing the next frame.

The processing performed by the video splitter 215 is shown in FIG. 6. The process starts at step 600, after which video data is received at step 605 from the associated video analyzer 210. A check is then made at step 610 to determine whether the encoder is operating in temporal division mode or spatial division mode. If yes, the process branches and at step 615 a splitter decision list is received from the array controller 225. The video data is then divided into temporal sections in accordance with the splitter decision list at step 620, after which an audio encoder node is designated at step 625. A check is then made at step 630 to determine whether to open GOP mode. If not, the process again branches and the video sections are submitted to the video encoders 230A-n as shown at step 635. However, if the GOP mode is to be opened at step 630, a copy of the final frame of each temporal section is appended to the beginning of the subsequent division, as shown at step 640, after which the video data including the GOP mode data is submitted to the video encoders as shown at step 635.

In addition, if the encoder is operating in spatial division mode, as determined at step 615, the process branches to step 650, where each frame is divided according to the number of video encoder nodes, after which the divided frames are submitted to the video encoders at step 635. The process then loops to begin processing the next sequence of video data.

The video encoder process may be better understood in connection with FIG. 7. The process starts at step 700, after which sections of video are received from the splitter 215 as shown at step 705. At step 710 a check is again made to determine whether the system is operating in temporal division mode or spatial division mode. If operating in temporal division mode, the process advances to step 715 where a frame type decision list is received from the video splitter. If operating in spatial division mode, the process advances to step 720 where a frame type decision list is received from the array controller. The branches rejoin at step 725, where the encoder compresses the current video section in accordance with the applicable frame type decision list. The compressed video information for that section is then submitted to the stream combiner 235 as shown at step 730, after which the process loops back to step 705 to process the next sections received from the splitter 215.

The audio encoder process, shown in FIG. 8, begins at step 800, and a frame of audio data is received from the audio/video source as shown at step 805. The frame of audio data is compressed as shown at step 810, after which the compressed audio information is submitted to the stream combiner 235 at step 815, and the process then loops back to step 805. It will be appreciated that each audio frame is associated with a video frame, although the compression of audio is considerably less complex than the associated compression of the video frame.

The stream combiner process is shown in FIG. 9, and begins at step 900. At step 905, the compressed video sections are received from the plurality of video encoders 230A-n. A check is then made at step 910 to determine whether the system is operating in temporal or spatial division mode. If temporal mode, the process branches to step 915, and a check is made to determine whether to open GOP mode for the section then being processed. If so, at step 920 the IDR frame is removed from the beginning of each section other than the initial section, after which the process advances to step 925. If the GOP mode did not need to be opened, the process bypasses step 920 and simply advances to step 925, where the sections are concatenated.

If the system was operating in spatial division mode, as determined at step 910, the video sections are concatenated at step 950, after which a slice header is appended at step 955, and a Picture Parameter Set (PPS) is appended at step 960. The two branches then rejoin at step 975, where a Sequence Parameter Set (SPS) is appended and the output data stream is provided. The process them loops back to step 905 and begins processing the next compressed video sections.

The operation of the array controller 225 can be better understood from the process flow diagram of FIG. 10. The process begins at step 1000, and at step 1005 the array manager receives scene change indicators from the video analyzer 210. Likewise, at step 1010, the array manager receives video complexity values from the video analyzer. A frame type decision list is then built at step 1015, with IDR frames being inserted at scene changes. A check is then made at step 1020 to determine whether the system is operating in spatial division mode or temporal division mode. If spatial division mode, at step 1025 the frame type decision list is submitted to the video encoders 230A-n, and the process loops to step 1005.

However, if the system is operating in temporal division mode, the process advances to step 1050, where a video splitter division list is developed. The splitter decision list is then submitted to the video splitter at step 1055, and a frame type decision list is also submitted to the video splitter as shown at step 1060. The process then loops back to step 1005 to begin processing the next input from the video analyzer.

Having fully described an exemplary arrangement of the present invention, it will be appreciated by those skilled in the art that many alternatives and equivalents exist which do not depart from the invention, and are intended to be encompassed herein.

We claim:

1. An array encoding system for processing high definition digital video data to generate an output data stream which is substantially consistent with the H.264 video communications standard, said array encoding system comprising:
   at least one input for receiving a high definition digital video data stream,
   a video analyzer for analyzing the complexity of the high definition digital video stream,
   a stat mux controller capable of processing the at least one input,
   a video splitter for splitting the high definition digital video stream into a plurality of subsidiary data streams in accordance with a predetermined criteria,
   a plurality of video encoders responsive to commands from the stat mux controller for processing each subsidiary data stream in accordance with an applicable encoding technique appropriate for encoding an H.264 complaint output, and
   a stream combiner for combining the plurality of processed subsidiary data streams.

2. The array encoding system of claim 1 wherein the system is scalable.

3. The array encoding system of claim 1 wherein the high definition digital video data stream includes audio data.

4. An array encoding method for processing high definition digital video data to generate an output data stream which is substantially consistent with the H.264 video communications standard comprising: using a processor to implement the steps of receiving a high definition digital video data stream, analyzing the complexity of the data stream, splitting the data stream into a plurality of subsidiary data streams in accordance with a predetermined criteria, processing each subsidiary data stream in accordance with an applicable encoding technique appropriate for encoding an H.264 compliant output, and combining the plurality of processed subsidiary data streams.

5. The array encoding method of claim 4 wherein the high definition digital video data stream includes audio information.

6. The array encoding method of claim 4 wherein the analyzing step includes extracting information relating to the complexity of the high definition digital video data stream.

7. The array encoding method of claim 6 wherein the complexity information includes at least one of the group comprising spatial complexity and temporal complexity.

8. The array encoding method of claim 4 wherein the predetermined criteria includes at least one of the group comprising spatial mode criteria and temporal mode criteria.

9. The array encoding method of claim 4 wherein the combining step includes appending applicable H.264 information.

10. The array encoding method of claim 4 further including the step of adjusting bit rate information in accordance with the complexity of the high definition digital video data stream.

11. The array encoding method of claim 10 wherein the step of adjusting bit rate information includes controlling the encoding process and the combining process.

12. The array encoding system of claim 1, wherein said video splitter divides the high definition digital video stream according to a selected division mode which includes at least one of the group comprising a spatial mode and a temporal mode.

13. The array encoding system of claim 1, wherein the predetermined criteria includes at least one of the group comprising a spatial mode criteria and a temporal mode criteria.

14. The array encoding system of claim 1, wherein said video analyzer extracts information relating to the complexity of the high definition digital video data stream.

15. The array encoding system of claim 14, wherein the complexity information includes at least one of the group comprising spatial complexity and temporal complexity.

16. The array encoding system of claim 1, wherein the stream combiner further appends applicable H.264 information to said processed subsidiary data streams.

17. The array encoding system of claim 14, wherein bit rate information is adjusted in accordance with the complexity of the high definition digital video data stream.

* * * * *

UNITED STATES PATENT AND TRADEMARK OFFICE
CERTIFICATE OF CORRECTION

PATENT NO. : 7,512,278 B2  Page 1 of 1
APPLICATION NO. : 10/820524
DATED : March 31, 2009
INVENTOR(S) : Magee et al.

It is certified that error appears in the above-identified patent and that said Letters Patent is hereby corrected as shown below:

Column 4, Line 43, after "quality", insert --.--.
Column 4, Line 55, delete "Video_encode" and insert --Video_encoder--.
Column 4, Lines 56-57, delete "Audio_encode" and insert --Audio_encoder--.
Column 4, Line 63, delete "video_encode" and insert --video_encoder--.
Column 5, Line 1, delete "audio_encode" and insert --audio_encoder--.

Signed and Sealed this

Twenty-ninth Day of June, 2010

David J. Kappos
*Director of the United States Patent and Trademark Office*